(12) United States Patent
Lee

(10) Patent No.: US 12,031,694 B2
(45) Date of Patent: Jul. 9, 2024

(54) LAMP FOR A VEHICLE HAVING AN OUTER LENS WITH A BLACK AND DIFFERENT COLORED PAINTED LAYERS WITH PERFORATIONS

(71) Applicant: HYUNDAI MOBIS CO., LTD., Seoul (KR)

(72) Inventor: Jaekwang Lee, Uiwang-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/349,648

(22) Filed: Jul. 10, 2023

(65) Prior Publication Data

US 2024/0183512 A1 Jun. 6, 2024

(30) Foreign Application Priority Data

Dec. 2, 2022 (KR) .................. 10-2022-0166490

(51) Int. Cl.
| | |
|---|---|
| *F21S 41/275* | (2018.01) |
| *B23K 26/035* | (2014.01) |
| *B23K 26/40* | (2014.01) |
| *F21S 43/20* | (2018.01) |
| *F21S 43/33* | (2018.01) |

(52) U.S. Cl.
CPC .......... *F21S 43/255* (2018.01); *B23K 26/035* (2015.10); *B23K 26/40* (2013.01); *F21S 41/275* (2018.01); *F21S 43/33* (2018.01)

(58) Field of Classification Search
CPC ....... F21S 41/275; F21S 43/33; F21S 43/2817
See application file for complete search history.

(56) References Cited

U.S. PATENT DOCUMENTS 11,384,915 B1 * 7/2022 Choo .................. F21S 43/145

* cited by examiner

*Primary Examiner* — Robert J May
(74) *Attorney, Agent, or Firm* — Novo TechIP International PLLC

(57) ABSTRACT

A lamp for a vehicle and a method for manufacturing the same are disclosed. An embodiment of the present disclosure provides a lamp comprising: an outer lens formed of a transparent material and having an inside surface facing a light source inside the lamp; a first color-painted layer, disposed on the inside surface of the outer lens and configured to have a same or similar color as an exterior color of a vehicle body of the vehicle; and a first black-painted layer, which is a different layer than the first color-painted layer and disposed on an inner surface of the first color-painted layer and configured to shield light emitted from the light source located inside the lamp toward the outer lens, wherein the first color-painted layer and the first black-painted layer include at least one first perforation extending through both the first color-painted layer and the first black-painted layer.

13 Claims, 13 Drawing Sheets

LAMP FOR A VEHICLE HAVING AN OUTER LENS WITH A BLACK AND DIFFERENT COLORED PAINTED LAYERS WITH PERFORATIONS

CROSS-REFERENCE TO RELATED APPLICATIONS

The present application claims priority to Patent Application No. 10-2022-0166490, filed on Dec. 2, 2022, in Korea, the entire contents of which are incorporated herein by reference.

TECHNICAL FIELD

The present disclosure relates to a lamp for a vehicle and an apparatus for manufacturing the same.

BACKGROUND

The contents described in this section simply provide background information for the present disclosure and do not constitute prior art.

In general, lamps for a vehicle are installed in the front or rear of the vehicle and serve to emit different lights according to different purposes to inform other vehicles or pedestrians of driving information, such as a location of the vehicle, a driving state, and a scheduled course. Since lamps for a vehicle have a great influence on the design and image of vehicles, lamps of various designs have recently been developed in consideration of not only functional aspects but also aesthetic aspects.

For example, a hidden lighting technology in which, when a lamp is not turned on, a structure of the lamp is similar to a color of the grille or body of the vehicle so the interior of the lamp is not visible, and when the light is turned on, light is emitted has been commercialized and has drawn attention.

Meanwhile, in order to simply implement the hidden lighting technology of the lamp as above, a method of depositing a metal material as a thin film on a lens inside the lamp may be used, but, in order to emit light only in a portion of a specific shape, it is difficult to implement with only the deposition method.

In particular, when only color painting is performed to emit light to exhibit a specific shape, light leakage, that is, a phenomenon in which light is partially transmitted between painted layers, occurs, so that the specific shape cannot be properly implemented.

SUMMARY

In view of the above, the present disclosure provides a lamp for a vehicle capable of emitting light to exhibit a specific shape without light leakage, and an apparatus for manufacturing the same.

According to an embodiment of the present disclosure to achieve such objectives provides a lamp configured to be mounted on a vehicle, the lamp comprising: an outer lens formed of a transparent material and having an inside surface facing a light source inside the lamp; a first color-painted layer, disposed on the inside surface of the outer lens and configured to have a same or similar color as an exterior color of a vehicle body of the vehicle on which the lamp is configured to be mounted; and a first black-painted layer, which is a different layer than the first color-painted layer and disposed on an inner surface of the first color-painted layer and configured to shield light emitted from the light source located inside the lamp toward the outer lens, wherein the first color-painted layer and the first black-painted layer include at least one first perforation extending through both the first color-painted layer and the first black-painted layer to allow light emitted from the light source inside the lamp to pass through the first color-painted layer and the first black-painted layer to the outer lens.

Further, the present disclosure provides a lamp configured to be mounted on a vehicle, the lamp comprising: an outer lens formed of a transparent material having an inner surface facing toward a light source inside the lamp and an outer surface located opposite side of the inner surface; a first black-painted layer disposed on the outer surface of the outer lens and configured to shield light emitted from the light source inside the lamp; and a first color-painted layer, which is a different layer than the first black-painted layer and which is disposed on an outer surface of the first black-painted layer and configured to have a same or similar color as an exterior color of a vehicle body of the vehicle on which the lamp is configured to be mounted, wherein the first color-painted layer and the first black-painted layer include at least one first perforation extending through both the first color-painted layer and the first black-painted layer to allow light emitted from the light source inside the lamp to pass through the first color-painted layer and the first black-painted layer to the outer lens.

Further, the present disclosure provides an apparatus for manufacturing the above lamp for a vehicle, wherein the apparatus includes a laser irradiator configured for irradiating the first color-painted layer and the first black-painted layer with a laser beam to perform the laser punching; and a fixing jig disposed below the laser irradiator to fix the outer lens as a target lens, including the first color-painted layer and the first black-painted layer formed thereon, to receive the laser beam from the laser irradiator to form the at least one first perforation.

As described above, according to the present embodiment, there is an effect of enabling light emission to exhibit a specific shape without light leakage

DETAILED DESCRIPTION

Figure 1A:
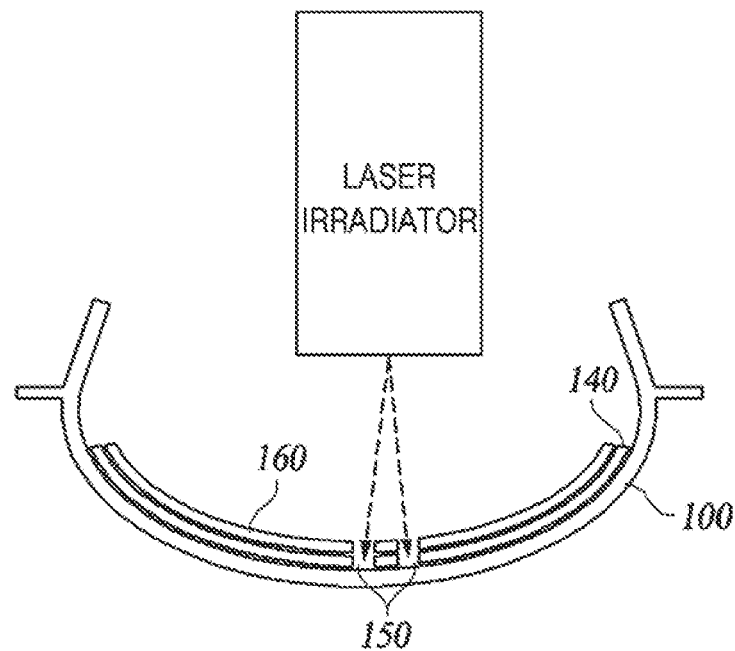
FIGS. 1A and 1B are schematic views of cross-sections of a lamp for a vehicle according to a first embodiment of the present disclosure.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary.

FIG. 1 is a schematic view of a cross-section of a lamp for a vehicle according to a first embodiment of the present disclosure.

Referring to FIG. 1, a lamp 10 for a vehicle according to a first embodiment of the present disclosure includes all or some of a light source (not shown), an outer lens 100, a first primer 120, a first color-painted surface or layer 140, and a first black-painted surface or layer 160.

The light source is configured to emit light toward the outer lens 100 to be described later, and may be configured such that at least one semiconductor light emitting device, such as a light emitting diode (LED) is disposed, but is not necessarily limited thereto.

The outer lens 100 is formed of a transparent material. To this end, the outer lens 100 may be configured using polycarbonate (PC) or polymethylmethacrylate (PMMA), but is not necessarily limited thereto.

In addition, a hard coating process may be performed on an outer surface of the outer lens 100 for weather resistance.

The first color-painted surface 140 is disposed inside the outer lens 100 and is configured to have the same or a similar color as an exterior color of a vehicle body. For example, the first color-painted surface 140 may be formed using black, white, red, and blue paint, but is not limited to these colors.

Since the first color-painted surface 140 has the same or similar color as the exterior color of the vehicle body, the lamp 10 for a vehicle according to the first embodiment of the present disclosure may appear as part of the vehicle body without being prominent in appearance.

Figure 1B:
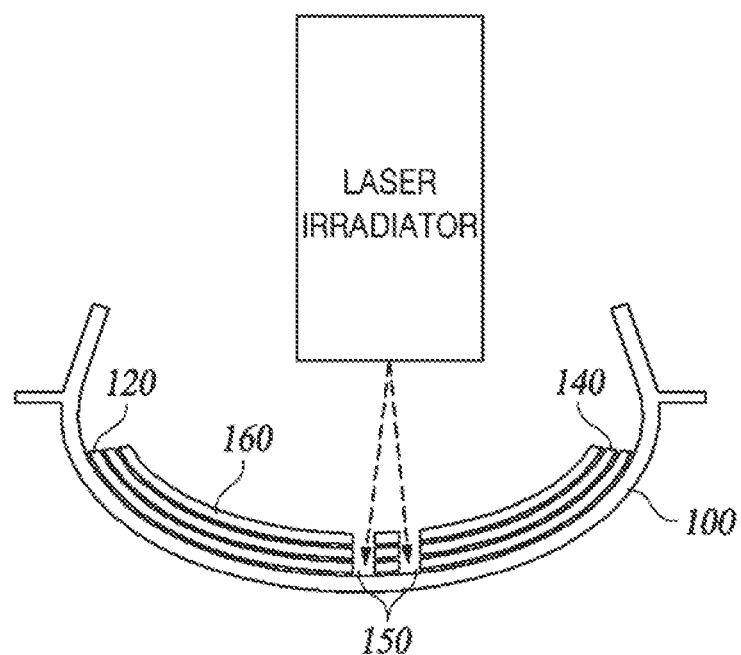

Meanwhile, as shown in FIG. 1B, the first primer layer 120 may be disposed between the outer lens 100 and the first color-painted surface 140 and may be painted to be formed on an inner surface of the outer lens 100. In this case, the first color-painted surface 140 may be painted to be formed on an inner surface of the first primer layer 120. The first primer layer 120 may reinforce the weather resistance of the outer lens 100, and may include an ultraviolet (UV) stabilizer to this end.

However, the lamp 10 for a vehicle according to the first embodiment of the present disclosure may not necessarily include the first primer layer 120, and as shown in FIG. 1A, when the first primer layer 120 is not included, the first color-painted surface 140 may be painted to be formed on the inner surface of the outer lens 100.

The first black-painted surface or layer 160 is painted to be formed on the inner surface of the first color-painted surface 140, and is configured to shield light emitted from the inside. Since the first black-painted surface or layer 160 is disposed inside the first color painted surface 140, light leakage from the inside may be prevented.

Meanwhile, in order to emit light in a specific shape, the first color-painted surface 140 and the first black-painted surface or layer 160 may include at least one first perforation 150 formed by laser punching.

In FIG. 1, as an example, two first perforations 150 are illustrated, but the number of at least one first perforations 150 is not necessarily limited thereto.

Light emitted from the light source may pass through the at least one first perforation 150, and it may be difficult for light to pass through a region in which the at least one first perforation 150 is not formed, by the first black-painted surface or layer 160. Therefore, since light passes through only at a position where the at least one first perforation 150 is formed, a specific shape may be seen when viewed from the outside.

Meanwhile, the number of laser irradiations for laser punching may be adjusted according to a color of the first color-painted surface 140. For example, when the color of the first color-painted surface 140 is black, red, blue, etc., laser irradiation may be performed 2 to 3 times, and when the color of the second color-painted surface or layer 360 is white, laser irradiation may be performed 3 to 4 times.

This is to reduce a deviation that may occur due to a difference in the degree of laser energy absorption for each color. That is, a relatively dark color has a high degree of heat absorption of laser energy, but a relatively bright color has a low degree of absorption of laser energy, so when the same number of laser irradiations are made for different colors, a perforation result may not guarantee the same effect.

For example, in the case of a bright color having a low degree of absorption, if the number of times that laser irradiation is performed is not sufficient, residue may remain on the painted surface. Therefore, it is necessary to differentiate the number of times laser irradiation is performed according to colors to a degree where carbonization or bubbles of an irradiation target does not occur.

FIG. 2 is a diagram illustrating a method for realizing a lattice-shaped design of a lamp for a vehicle according to a first embodiment of the present disclosure.

Figure 2A:
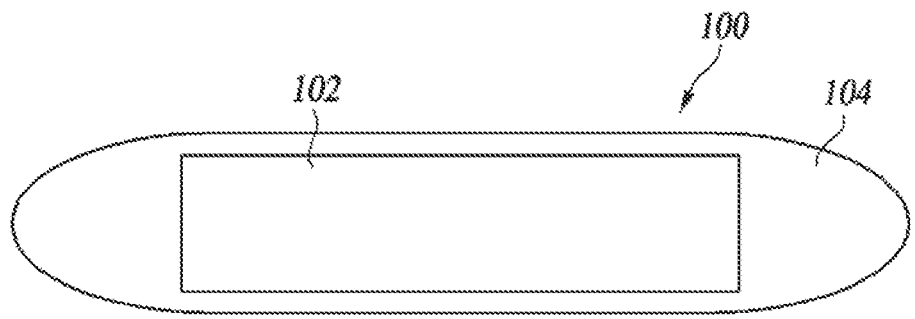
FIGS. 2A-2C are diagrams illustrating a method for realizing a lattice-shaped design of a lamp for a vehicle according to the first embodiment of the present disclosure.

As shown in FIG. 2A, the outer lens 100 may be injected (i.e., formed by an injection molding process) by a multi-color injection method and may include a clean portion 102 (i.e., a substantially clear or transparent portion), which is a bright region in the center of the outer lens, and a dark portion 104, which is a relatively dark region at the edge surrounding the center.

Figure 2B:
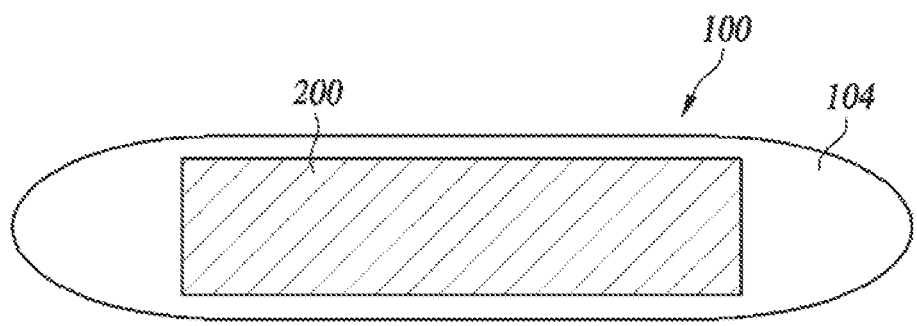
Figure 2C:
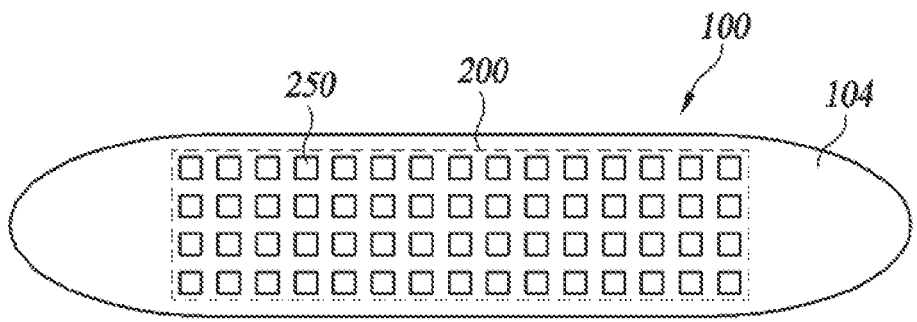

Here, as shown in FIG. 2B, an internal black-painted surface or layer 200 may be painted on an inner surface of the clean portion 102, and laser punching may be performed on the internal black-painted surface or layer 200 to form lattices 250 corresponding to the at least one first perforation 150 as shown in FIG. 2C.

Conventionally, even the design was injected at once by the multi-color injection method to form the design, but in this case, in order to form the lattices 250 as shown in FIG. 2C, weld lines and air traps as many as the number of lattices 250 may occur. Therefore, if the lattice pattern is formed using the process of FIG. 2, the aforementioned problem may be solved, and accordingly, the problem of severe glare of the exterior may also be solved.

Meanwhile, although not shown in the drawing, the shape shown in FIG. 2C may be obtained by directly printing a lattice pattern on the outer lens 100 as shown in FIG. 2A. For example, when inkjet printing technology is used on the inner surface of the clean portion 102, the lattices 250 corresponding to at least one first perforation 150 may be formed.

In this case, since painting and laser punching of the internal black-painted surface or layer 200 are not required, the process may be simplified and product damage due to laser punching may be prevented.

Meanwhile, in lamps 30 and 40 for a vehicle according to second and third embodiments to be described later, the description related to the formation of the lattice pattern in FIG. 2 is omitted, but the description related to the formation of the lattice pattern in FIG. 2 may also be applied to the lamps 30 and 40 for a vehicle according to the second and third embodiments.

FIG. 3 is a schematic view of a cross-section of a lamp for a vehicle according to a second embodiment of the present disclosure.

Referring to FIG. 3, the lamp 30 for a vehicle according to the second embodiment of the present disclosure includes all or some of a light source (not shown), an outer lens 300, a second primer layer 320, a second black-painted surface or layer 340, a second color-painted surface or layer 360, and a protective painted surface or layer 380.

Hereinafter, differences compared to lamp 10 for a vehicle according to the first embodiment will be mainly described. Except for the details described below, the lamp 30 for a vehicle according to the second embodiment may be understood by the details for the lamp 10 for a vehicle according to the first embodiment.

The second black-painted surface or layer 340 is disposed outside the outer lens 300 and is configured to shield light emitted from the inside. Since the second black-painted surface or layer 340 is disposed outside the outer lens 300, it is possible to prevent light leakage from the inside.

Figure 3A:
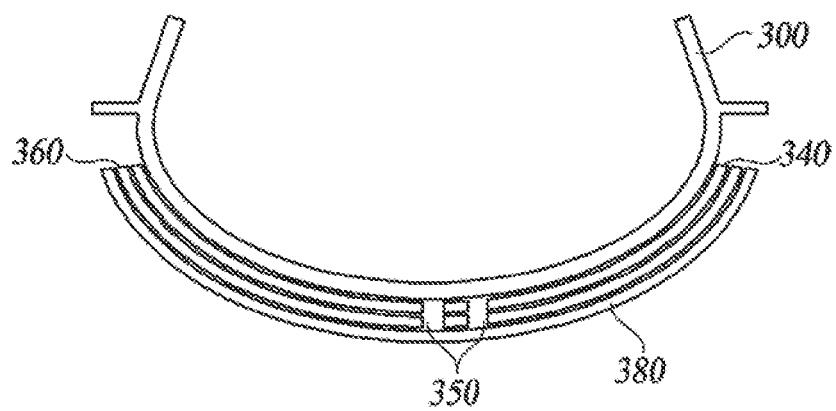
FIGS. 3A and 3B are schematic views of cross-sections of a lamp for a vehicle according to a second embodiment of the present disclosure.
Figure 3B:
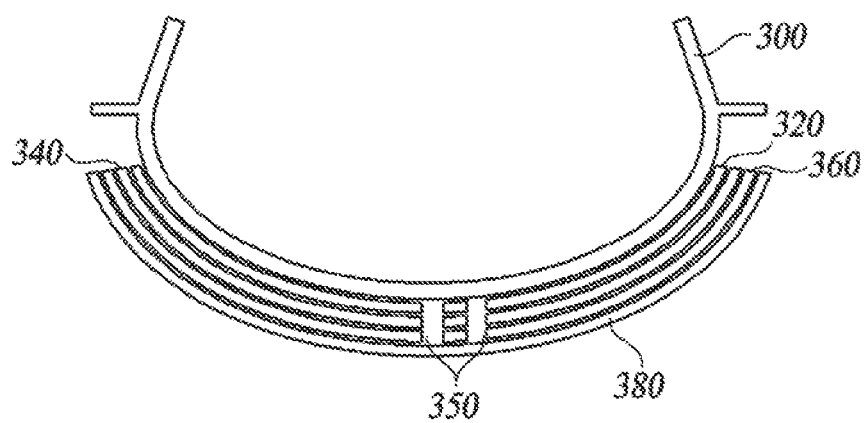

Meanwhile, as shown in FIG. 3B, the second primer layer 320 may be disposed between the outer lens 300 and the second black-painted surface or layer 340 and may be painted to be formed on the outer surface of the outer lens 300. In this case, the second black-painted surface or layer 340 may be painted to be formed on an outer surface of the second primer layer 320. Unlike the first primer layer 120, the second primer layer 320 may be a component required to increase adhesion between lenses.

However, the lamp 30 for a vehicle according to the second embodiment of the present disclosure may not necessarily include the second primer layer 320, and as shown in FIG. 3A, when the second primer layer 320 is not included, the second black-painted surface or layer 340 may be painted to be formed on the outer surface of the outer lens 300.

The second color-painted surface or layer 360 may be painted to be formed on an outer surface of the second black-painted surface or layer 340 and may be configured to have the same or similar color as the exterior color of the vehicle body. For example, the second color-painted surface or layer 360 may be made using black, white, red, and blue paint, but is not limited to these colors.

Since the second color-painted surface or layer 360 has the same or similar color as the exterior color of the vehicle body, the lamp 30 for a vehicle according to the second embodiment of the present disclosure may appear as part of the vehicle body without being prominent in appearance.

Meanwhile, in order to emit light in a specific shape, the second color-painted surface or layer 360 and the second black-painted surface or layer 340 may include at least one second perforation 350 formed by laser punching.

In FIG. 3, as an example, two second perforations 350 are illustrated, but the number of at least one second perforations 350 is not necessarily limited thereto.

Light emitted from the light source may pass through the at least one second perforation 350, and it may be difficult for light to pass through a region in which the at least one second perforation 350 is not formed, by the second black-painted surface or layer 340. Therefore, since light passes through only at a position where the at least one second perforation 350 is formed, a specific shape may be seen when viewed from the outside.

Meanwhile, the number of times laser irradiation is performed for laser punching may be adjusted according to a color of the second color-painted surface or layer 360.

The protective painted surface or layer 380 may be painted on an outer surface of the second color-painted surface or layer 360 and formed to be transparent. The protective painted surface or layer 380 is preferably transparent so that light passing through at least one second perforation 350 may be transmitted and may serve to protect the outside of the second color-painted surface or layer 360. In addition, the protective painted surface or layer 380 may include a UV stabilizer in order to secure weather resistance quality of the entire lens product.

FIG. 4 is a schematic view of a cross-section of a lamp for a vehicle according to the third embodiment of the present disclosure.

Referring to FIG. 4, the lamp 40 for a vehicle according to a third embodiment of the present disclosure includes all or some of a light source (not shown), an outer lens 400, a deposition surface or layer 420, and a third black-painted surface or layer 440.

Hereinafter, differences compared to the lamps 10 and 30 for a vehicle according to the first and second embodiments will be mainly described. Except for the details described below, the lamp 40 for a vehicle according to the third embodiment may be understood by the details for the lamps 10 and 30 for a vehicle according to the first and second embodiments.

The deposition surface or layer 420 is deposited on an inner surface of the outer lens 400. The deposition surface or layer 420 may be formed of a metal material, such as aluminum (Al) or nickel chrome (NiCr), but is not necessarily limited thereto as long as the deposition surface has a metal texture.

In addition, light transmittance of the deposition surface or layer 420 may be 1% to 10%. Accordingly, the texture of metal may be displayed well by using the deposition surface or layer 420 having a much lower light transmittance than the light transmittance of the related art.

Figure 4A:
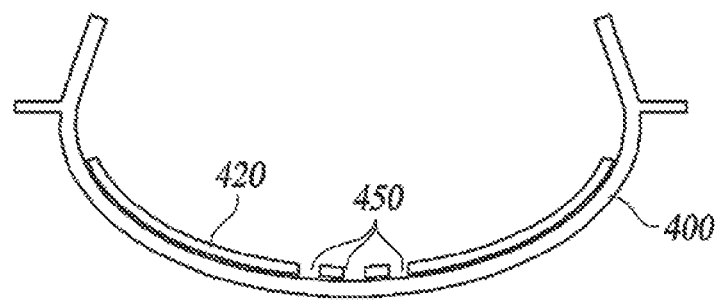
FIGS. 4A and 4B are schematic views of cross-sections of a lamp for a vehicle according to a third embodiment of the present disclosure.

As shown in FIG. 4A, the deposition surface or layer 420 may include at least one third perforation 450 formed by laser punching. Although the number of at least one third perforations 450 is shown as three in FIG. 4, the number of at least one third perforations 450 is not necessarily limited thereto.

In this case, a portion of light emitted from the inside may pass through the at least one third perforations 450, and another portion may pass through the deposition surface or layer 420. Since black painting is not performed, from the outside, the entire surface of the outer lens 400 may appear to emit light. Therefore, it is possible to implement the lamp so that the lamp may show a color of the metal texture when not turned on, and may be turned on brightly regardless of the color when turned on.

Figure 4B:
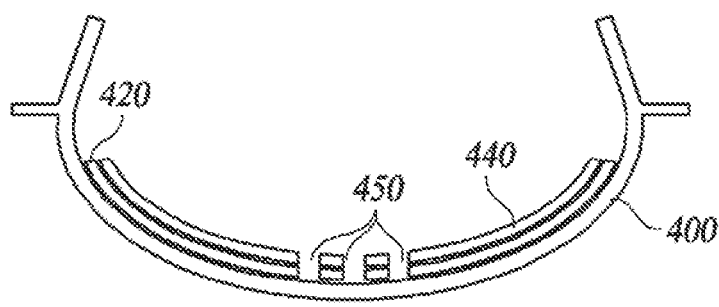

Meanwhile, as shown in FIG. 4B, the third black-painted surface or layer 440 may be painted to be formed on the inner surface of the deposition surface or layer 420. The third black-painted surface or layer 440 may shield light emitted from the inside.

Here, in order to emit light in a specific shape, the deposition surface or layer 420 and the third black-painted surface or layer 440 may include at least one third perforation 450 by laser punching. That is, at least one third perforation 450 may also be formed on the third black-painted surface or layer 440 by laser punching. In this case, since light passing through only at least one third perforation 450 may be seen from the outside, a design having a specific shape may be realized.

FIG. 5 is a view illustrating several embodiments of an apparatus for manufacturing a lamp for a vehicle according to an embodiment of the present disclosure.

Hereinafter, various embodiments of a manufacturing apparatus capable of manufacturing the lamps 10, 30, and 40 for a vehicle according to an embodiment of the present disclosure described above will be described according to sizes of a lens, etc.

Manufacturing apparatuses 50, 52, and 54 for manufacturing the lamps 10, 30, and 40 for a vehicle according to an embodiment of the present disclosure may include a laser irradiator 500 for laser punching and a fixing jig 550 disposed below the laser irradiator 500 to fix a target lens 520.

Figure 5A:
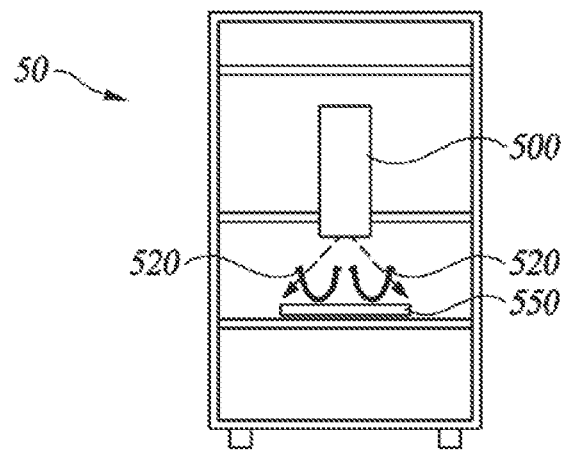
FIGS. 5A-5C are views illustrating several embodiments of an apparatus for manufacturing a lamp for a vehicle according to an embodiment of the present disclosure.

Referring to FIG. 5A, a manufacturing apparatus 50 according to a first embodiment shows a case in which a size of a lens is small. In this case, by irradiating two target lenses 520 per laser irradiator 500, it is possible to manufacture two lamps for a vehicle simultaneously.

Figure 5B:
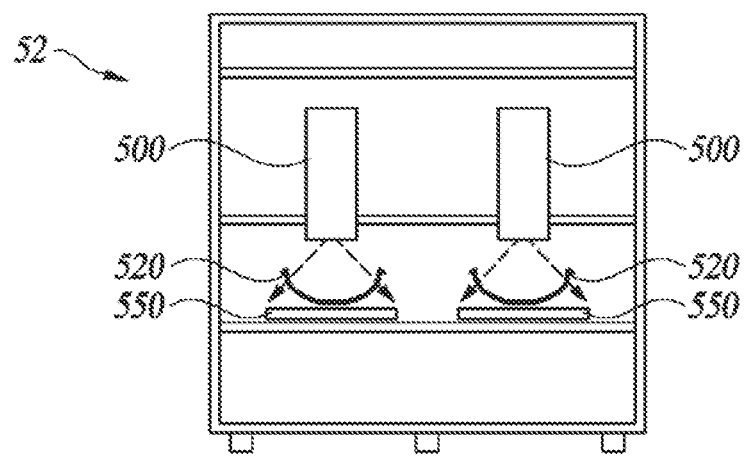

Referring to FIG. 5B, a manufacturing apparatus 52 according to a second embodiment shows a case in which a size of a lens is medium. In this case, it is possible to irradiate one target lens 520 per laser irradiator 500 and simultaneously manufacture two lamps for a vehicle with two laser irradiators 500.

Figure 5C:
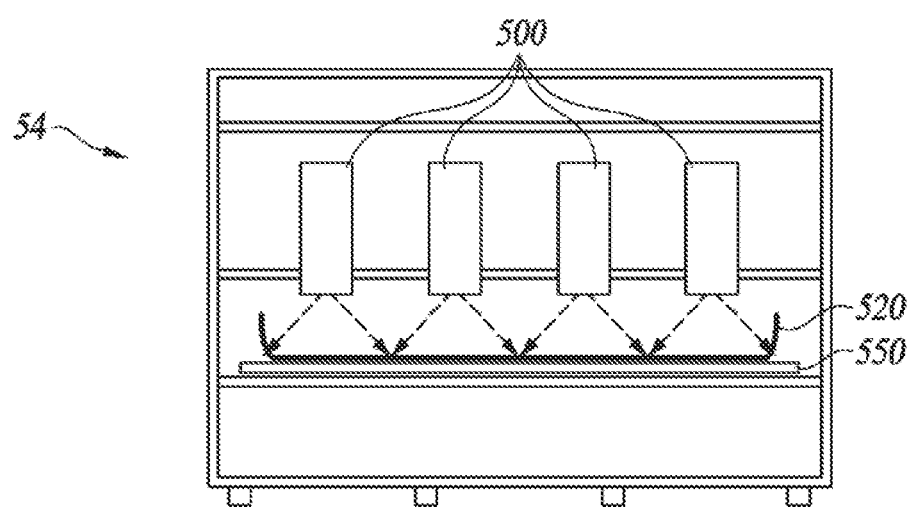

Referring to FIG. 5C, a manufacturing apparatus 54 according to a third embodiment shows a case in which a size of a lens is large. In this case, in FIG. 5C, it is shown that four laser irradiators 500 irradiate each portion of one target lens 520 to manufacture one lamp for a vehicle, but the number of laser irradiators 500 is not necessarily limited to four.

FIG. 6 is a view illustrating a height adjustment method of a manufacturing apparatus for laser punching according to an embodiment of the present disclosure.

Referring to FIG. 6, the manufacturing apparatuses 50, 52, and 54 according to an embodiment of the present disclosure may adjust heights for laser punching.

Figure 6A:
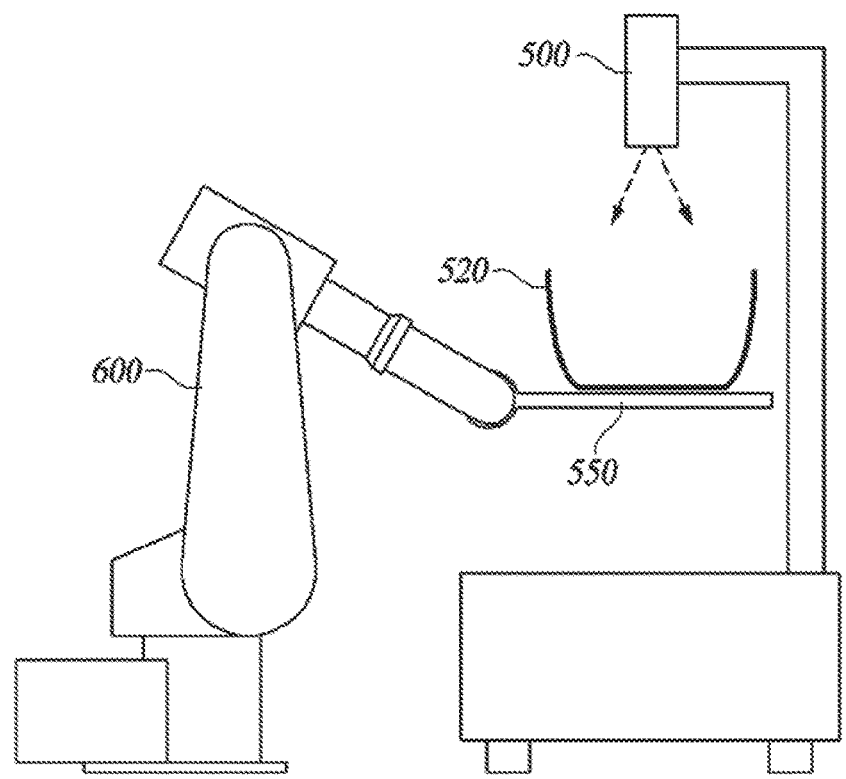
FIGS. 6A and 6B are views illustrating a height adjustment method of a manufacturing apparatus for laser punching according to an embodiment of the present disclosure.
Figure 6B:
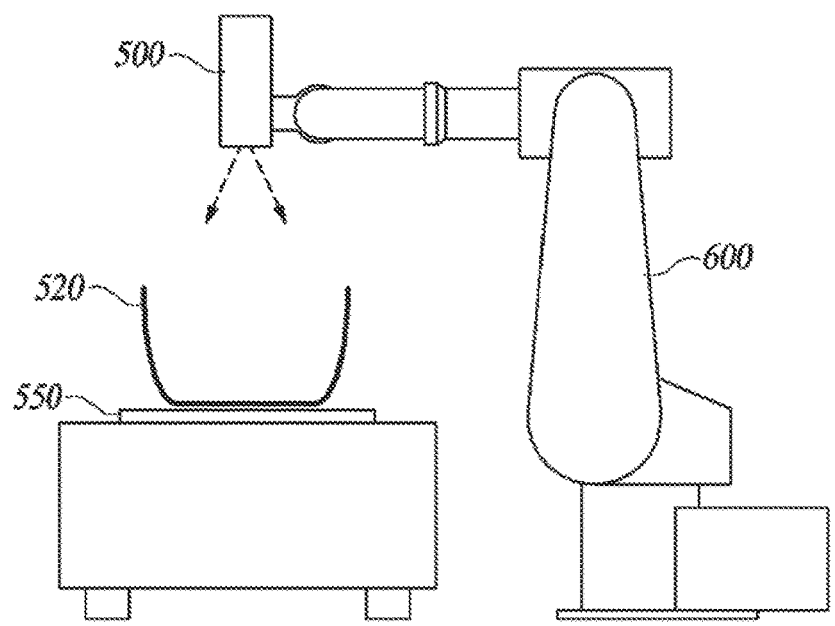

For example, as shown in FIG. 6A, a robot arm 600 may adjust a height of the fixing jig 550 in a state in which a height of the laser irradiator 500 is fixed, and as shown in FIG. 6B, the robot arm 600 may adjust the height of the laser irradiator 500 in a state in which the height of the fixing jig 550 is fixed.

Figure 7:
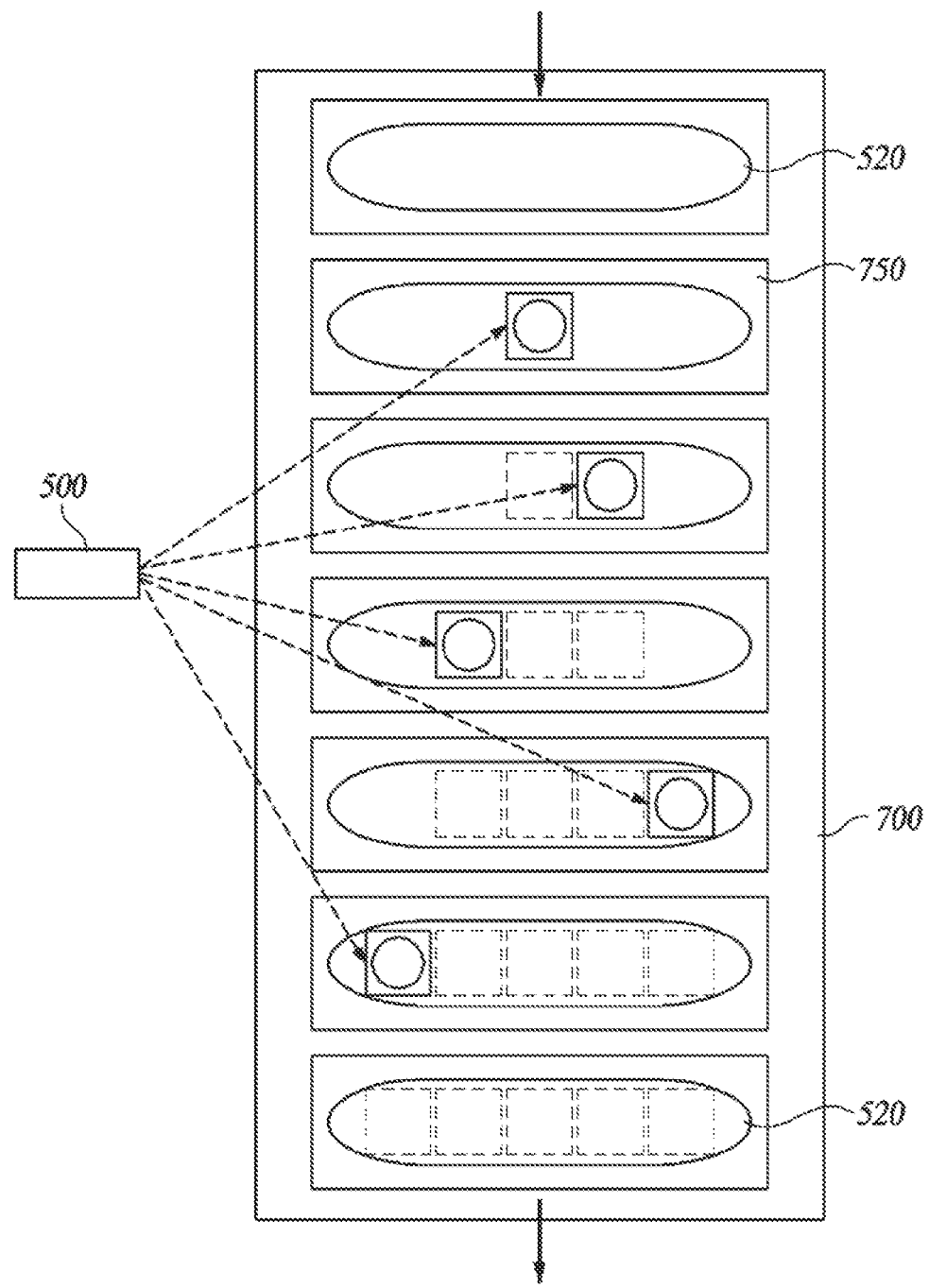
FIG. 7 is a view illustrating an example in which a manufacturing apparatus according to the third embodiment of the present disclosure performs a laser punching operation.

FIG. 7 is a view illustrating an example in which the manufacturing apparatus according to the third embodiment of the present disclosure performs a laser punching operation.

Although FIG. 7 shows an example of a case in which the target lens 520 is large, the size of the target lens 520 is not limited to the large size.

A conveyor belt 700 may move at least one target lens 520 from one side to the other side. Here, the target lens 520 may be seated on a seating jig 750 placed on the conveyor belt 700.

In addition, the laser irradiator 500 may perforate each portion of the target lens 520 while the target lens 520 moves from one side to the other. In FIG. 7, it is illustrated that one laser irradiator 500 perforates each portion of the target lens 520, but the present disclosure is not limited thereto, and a configuration such that several laser irradiators 500 perforate portions of the target lens 520 respectively is possible.

By placing several target lenses 520 on the conveyor belt 700 and perforating each portion of each target lens 520, the time for producing a finished product may be shortened.

FIG. 8 is a view illustrating a portion of a manufacturing apparatus according to the first and second embodiments of the present disclosure for fixing a position of a target lens.

FIG. 9 is a view illustrating a portion of a manufacturing apparatus according to the third embodiment of the present disclosure for fixing a position of a target lens.

Figure 8A:
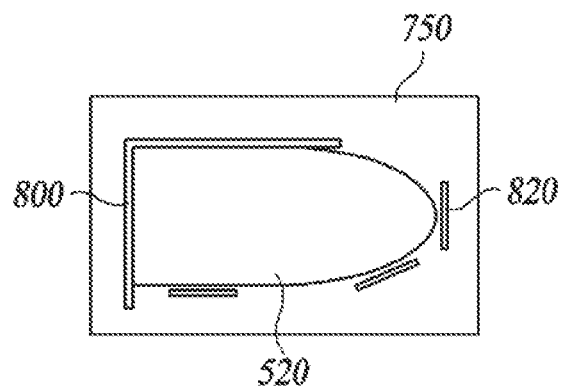
FIGS. 8A and 8B are views illustrating portions of a manufacturing apparatus according to the first and second embodiments of the present disclosure for fixing a position of a target lens.
Figure 8B:
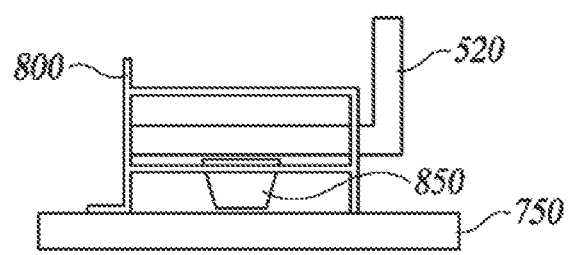

Referring to FIG. 8A and FIG. 8B, the manufacturing apparatuses 50 and 52 according to the first and second embodiments of the present disclosure may include a positioning bracket 800, a guide bracket 820, and a vacuum absorber 850 as components for fixing a medium or small lens on the seating jig 750.

Figure 9A:
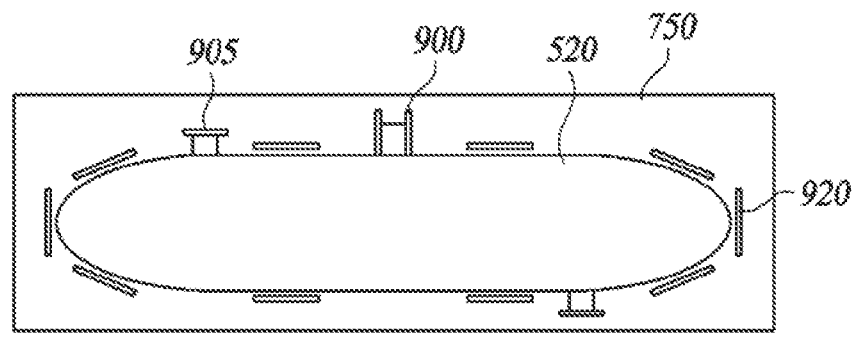
FIGS. 9A and 9B are views illustrating portions of a manufacturing apparatus according to a third embodiment of the present disclosure for fixing a position of a target lens.
Figure 9B:
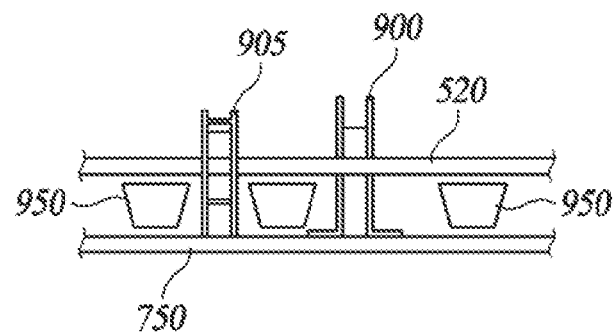

Referring to FIG. 9A and FIG. 9B, the manufacturing apparatus 54 according to the third embodiment of the present disclosure may include a left/right positioning bracket 900, an upper/lower positioning bracket 905, a guide bracket 920, and a vacuum absorber 950, as components for fixing a large lens on the seating jig 750.

When laser punching is performed on the target lens 520 after injection and painting, an injection product may be deformed due to the laser punching, or a deviation a position to be subsequently punched may occur. Accordingly, the above configurations may be required to fix the position of the target lens 520.

For example, the target lens 520 may be seated on the seating jig 750 using the guide brackets 820 and 920 guiding the seating of the target lens 520. Here, when the size of the target lens 520 is medium or small, a vertical position, as well as a horizontal position, may be fixed using one positioning bracket 800, and when the size of the target lens 520 is large, the two positioning brackets 900 and 905 may fix the vertical and horizontal positions, respectively.

Meanwhile, the vacuum absorbers 850 and 950 may be disposed at a lower portion of a bottom surface located opposite to the punched surface of the target lens 520 to prevent the target lens 520 from being displaced. In FIG. 8 and FIG. 9, it is shown that one vacuum absorber 850 is disposed below the medium/small target lens 520 and three vacuum absorbers 950 are disposed below the large target lens 520. However, the number of vacuum absorbers 850 and 950 is not necessarily limited thereto.

Figure 10A:
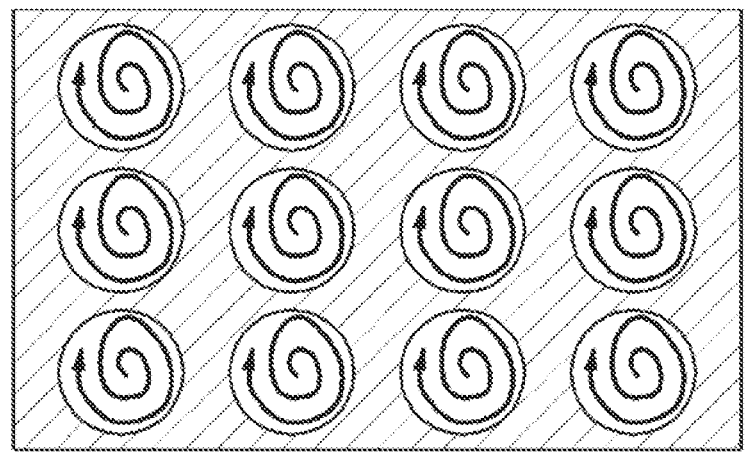
FIGS. 10A and 10B are views illustrating a difference between a laser punching method of the related art and a laser punching method according to the present disclosure.
Figure 10B:
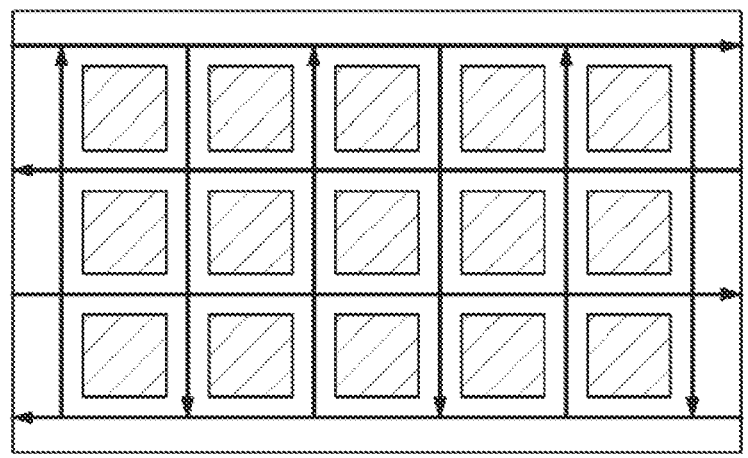

FIG. 10 is a view illustrating a difference between a laser punching method of the related art and a laser punching method according to the present disclosure.

Referring to FIG. 10, since the laser punching method according to the present disclosure uses a straight punching method rather than a circular punching method of the related art, a process time may be shortened, compared to the punching method of the related art.

Meanwhile, although not shown in the drawings, in order to implement various designs such as emblems, color and black painting may be applied to the injection product and dried, and thereafter, shapes such as emblems, may be punched by a laser, and the laser punched surface may be painted in various colors or a metal material may be deposited.

In addition, in order to increase transparency when implementing the emblem shape on the outer lenses 100, 300, and 400, only an emblem region may be separately transparently injected instead of laser punching, and the injected emblem may be assembled to the outer lenses 100, 300, and 400 using a hot staking or screw coupling method.

Although exemplary embodiments of the present disclosure have been described for illustrative purposes, those having ordinary skill in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand that the scope of the claimed invention is not to be limited by the above explicitly described embodiments but by the claims and equivalents thereof.

What is claimed is:

1. A lamp configured to be mounted on a vehicle, the lamp comprising:
    an outer lens formed of a transparent material and having an inside surface facing a light source inside the lamp;
    a first color-painted layer, disposed on the inside surface of the outer lens and configured to have a same or similar color as an exterior color of a vehicle body of the vehicle on which the lamp is configured to be mounted; and
    a first black-painted layer, which is a different layer than the first color-painted layer and disposed on an inner surface of the first color-painted layer and configured to shield light emitted from the light source located inside the lamp toward the outer lens,
    wherein the first color-painted layer and the first black-painted layer include at least one first perforation extending through both the first color-painted layer and the first black-painted layer to allow light emitted from the light source inside the lamp to pass through the first color-painted layer and the first black-painted layer to the outer lens.

2. The lamp of claim 1, further comprising:
    a first primer layer disposed between the outer lens and the first color-painted layer and disposed on the inside surface of the outer lens,
    wherein the first color-painted layer is disposed on an inner surface of the first primer layer.

3. The lamp of claim 1, wherein:
    the outer lens includes a substantially clear portion, which is located in a center portion of the outer lens, and a dark portion which is a relatively dark region located on opposite sides of the substantially clear portion,
    the lamp further comprises an internal black-painted layer painted on an inner surface of the substantially clear portion, and
    lattices corresponding to the at least one first perforation are formed by laser punching the internal black-painted layer.

4. The lamp of claim 1, wherein:
    the outer lens includes a substantially clear portion, located in a center portion of the outer lens, and a dark portion, which is a relatively dark region at an edge of the center portion, and
    lattices corresponding to the at least one first perforation are formed by performing inkjet printing on an inner surface of the clear portion.

5. The lamp of claim 1, wherein the least one first perforation is formed by laser punching, and a number of laser irradiations for the laser punching is adjusted according to a color of the first color-painted layer.

6. A lamp configured to be mounted on a vehicle, the lamp comprising:
    an outer lens formed of a transparent material having an inner surface facing toward a light source inside the lamp and an outer surface located opposite side of the inner surface;
    a first black-painted layer disposed on the outer surface of the outer lens and configured to shield light emitted from the light source inside the lamp; and a first color-painted layer, which is a different layer than the first black-painted layer and which is disposed on an outer surface of the first black-painted layer and configured to have a same or similar color as an exterior color of a vehicle body of the vehicle on which the lamp is configured to be mounted,
    wherein the first color-painted layer and the first black-painted layer include at least one first perforation extending through both the first color-painted layer and the first black-painted layer to allow light emitted from the light source inside the lamp to pass through the first color-painted layer and the first black-painted layer.

7. The lamp of claim 6, further comprising:
    a first primer layer disposed between the outer lens and the first black-painted layer and painted to be formed on an outer surface of the outer lens, and
    the first black-painted surface is painted to be formed on the outer surface of the first primer layer.

8. The lamp of claim 6, further comprising:
    a protective layer painted on an outer surface of the first color-painted layer and formed to be transparent.

9. The lamp of claim 6, wherein the at least one first perforation is formed by laser punching, and a number of laser irradiations for the laser punching is adjusted according to a color of a second color-painted surface.

10. A lamp mounted on a vehicle, the lamp comprising:
    an outer lens formed of a transparent material; and
    a deposition layer formed of a metal material deposited on an inner surface of the outer lens,
    wherein the deposition layer includes at least one first perforation formed by laser punching.

11. The lamp of claim 10, wherein light transmittance of the deposition layer is 1% to 10%.

12. The lamp of claim 10, further comprising:
    a first black-painted surface painted formed on an inner surface of the deposition layer and configured to shield light emitted from a light source located inside the lamp,
    wherein the at least one first perforation is formed on the first black-painted surface by the laser punching.

13. The lamp of claim 10, wherein the outer lens is formed by multi-color injection to form the outer lens with a substantially clear portion and a dark portion.

\* \* \* \* \*